United States Patent
van Schalkwyk

(10) Patent No.: US 7,728,885 B2
(45) Date of Patent: Jun. 1, 2010

(54) SYSTEM FOR CAPTURING AND DISPLAYING DIGITAL IMAGES

(76) Inventor: Mark van Schalkwyk, 384 Van Brunt St., Brooklyn, NY (US) 11231

( * ) Notice: Subject to any disclaimer, the term of this patent is extended or adjusted under 35 U.S.C. 154(b) by 384 days.

(21) Appl. No.: 11/537,229

(22) Filed: Sep. 29, 2006

(65) Prior Publication Data
US 2008/0106613 A1 May 8, 2008

(51) Int. Cl.
H04N 5/76 (2006.01)
H04N 5/222 (2006.01)
G06F 13/00 (2006.01)

(52) U.S. Cl. .............. 348/231.2; 348/333.11; 725/44

(58) Field of Classification Search .......... 348/207.1, 348/211.1–211.4, 211.6, 231.2; 725/41–45
See application file for complete search history.

(56) References Cited

U.S. PATENT DOCUMENTS

| | | | |
|---|---|---|---|
| 6,085,195 A * | 7/2000 | Hoyt et al. ............ 707/10 |
| 7,339,615 B2 * | 3/2008 | Nishimura et al. ....... 348/220.1 |
| 7,443,418 B2 * | 10/2008 | Bryant et al. ........... 348/207.1 |
| 7,565,059 B2 * | 7/2009 | Neuman ................ 386/52 |
| 2003/0090585 A1 * | 5/2003 | Anderson ............. 348/333.11 |
| 2004/0041902 A1 * | 3/2004 | Washington ........... 348/14.01 |
| 2004/0201692 A1 * | 10/2004 | Parulski et al. ......... 348/207.1 |
| 2005/0068443 A1 * | 3/2005 | Naito .................. 348/333.01 |
| 2005/0134688 A1 * | 6/2005 | Belz et al. ............. 348/207.1 |
| 2006/0136972 A1 * | 6/2006 | Metzger et al. ........... 725/105 |
| 2006/0215052 A1 * | 9/2006 | Nagaoka et al. ........ 348/333.06 |
| 2006/0269264 A1 * | 11/2006 | Stafford et al. ........... 396/56 |

* cited by examiner

Primary Examiner—Nhan T Tran
Assistant Examiner—Trung Diep
(74) Attorney, Agent, or Firm—Gottlieb, Rackman & Reisman, P.C.

(57) ABSTRACT

A system for capturing and displaying images of subjects includes a digital camera and a slide show controller disposed in a common case. A subject can take his own picture using the digital camera. The resulting image is stored in an electronic folder with other images and all the images from the folder are distributed by a controller to several large displays.

17 Claims, 4 Drawing Sheets

SYSTEM FOR CAPTURING AND DISPLAYING DIGITAL IMAGES

RELATED APPLICATIONS

None

BACKGROUND OF THE INVENTION a. Field of Invention

This invention pertains to a system and apparatus for capturing high quality digital images of models and other subjects and to display the images concurrently on a plurality of large screens. Optionally, the images are stored and/or printed.

b. Description of the Prior Art

Photo booths have been with us since the 50's and they are used to make wallet sized pictures using wet chemistry. The pictures produced are very low quality but the devices are somewhat popular because they provide almost instantaneous results.

More recent apparatus have been proposed that produce somewhat better results. See for instance U.S. Pat. No. 5,262,815 disclosing a modular photographic system, U.S. Patent Publication 20010011262 disclosing a digital public photo booth capable of sending a digital image to a remote location; Japanese Patent Publication JP 2001311993A2 which discloses a photo booth that takes a picture of a subject and superimposes a selected background on the resulting image; U.S. Pat. No. 5,623,581 discloses takes an image of a subject, defocuses the background and superimposes a selected image as background; U.S. Pat. No. 6,298,197 discloses a photo booth generating pictures by printing images from a video camera; EP Application 1059799 discloses a digital photo booth with a video camera generating images of a subject, a monitor for displaying the images and a printer for making pictures from the images; U.S Pat. No. 3,852,783 discloses an electronic photo studio with strobe lights a camera exposing images on a film and a processing device for developing the exposed film; U.S. Pat. No. 5,446,515 discloses a photo booth with a movable camera and a movable background.

However, all these devices are constructed and designed as a unitary permanent or semi-permanent structure placed usually in a high volume area. Moreover, the quality of images and pictures obtained from these devices are not very high.

SUMMARY OF THE INVENTION

The present invention allows users to capture images of themselves, which are then stored on a computer hard drive and displayed via large displays such as plasma screens, projection screens, video screens and the like, as well as on a computer monitor. The images of subjects may also be captured by an attendant. Once several images are collected, they can be displayed sequentially or randomly as a slide show presentation. One important feature of the invention is that lighting elements are used to light the subjects in extremely flattering manner. Another important feature is that the display software instantly shows each new image as it is captured. This creates an interaction between the user and the equipment that has not been available before.

Preferably the system for performing the invention includes an image capture apparatus disposed in a self-contained case and the created images are stored in an electronic folder. A slide presentation program checks the contents of the folder and presents the images through a distribution network to a plurality of screens.

DETAILED DESCRIPTION OF THE INVENTION

Figure 1:
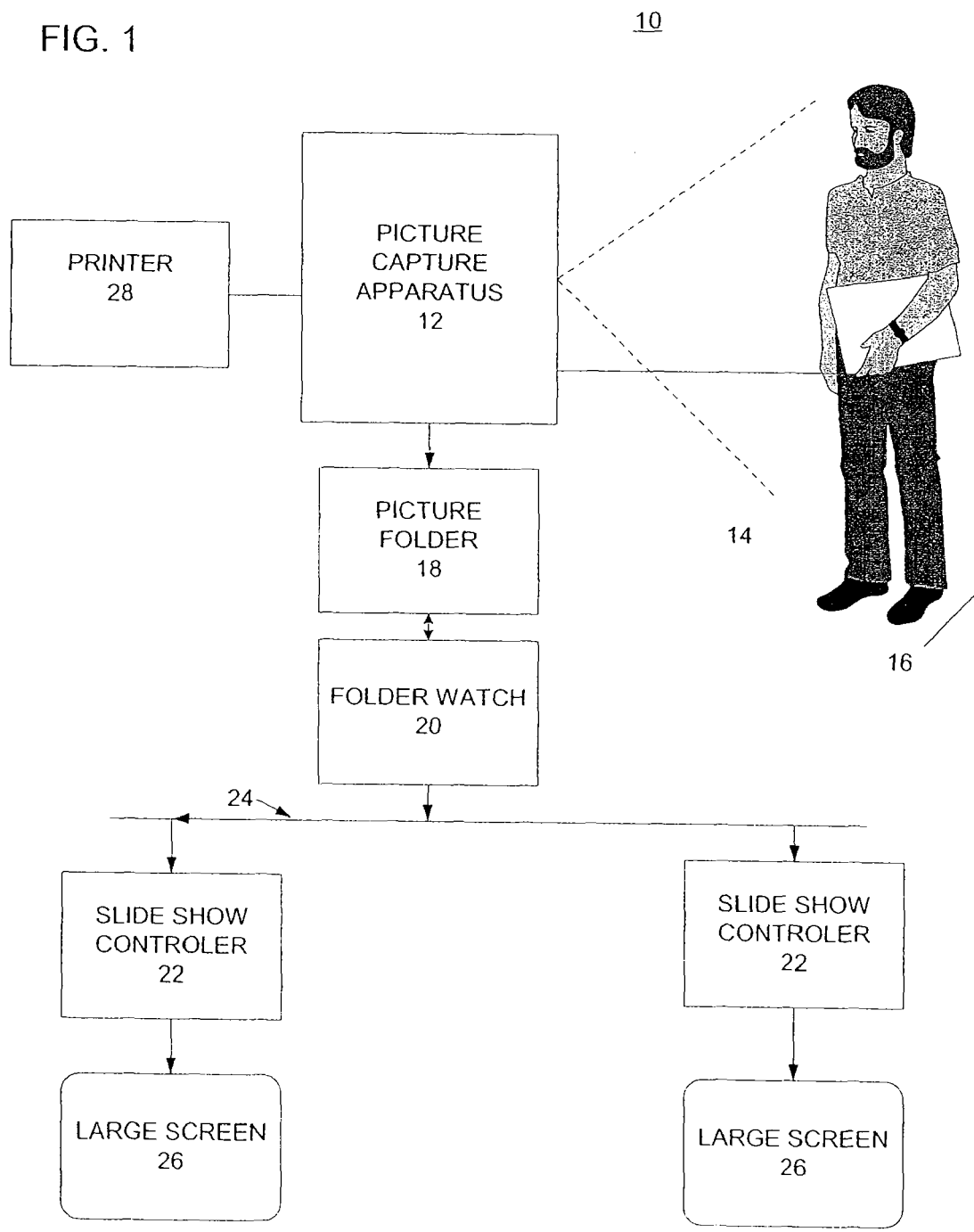
FIG. 1 shows a block diagram of an image distribution system constricted in accordance with this invention.

Referring now to FIG. 1, a system 10 constructed in accordance with this invention includes a picture capture apparatus 12 used to capture an image of a subject 14. Preferably, a screen 16, a wall or other opaque means are used to block extraneous objects so that they do not appear in the image. Moreover, the screen 16 may also be used to provide a static or dynamic background for the image.

The images from the apparatus 12 are stored in a picture folder 18. Folder 18 may be an electronic file stored on a hard-drive, or any other memory means such as flash cards. The contents of the folder 18 are monitored by a folder watch 20. The images are then distributed to a plurality of microprocessor-based slide show controllers 22 via network 24. The controllers 22 feed the images to respective large screens 26. The screens 26 may have different sizes, types and formats and therefore may require different the images in different formats as well. The controllers 22 receive the images from folder watch 20 in a standard format and then convert them into any respective formats, as needed, and present them for a predetermined time period, such as three seconds. Details of how this can be implemented are discussed below, in conjunction with the flow chart of FIG. 4. The network 24 can be a wired or a wireless network.

Figure 3:
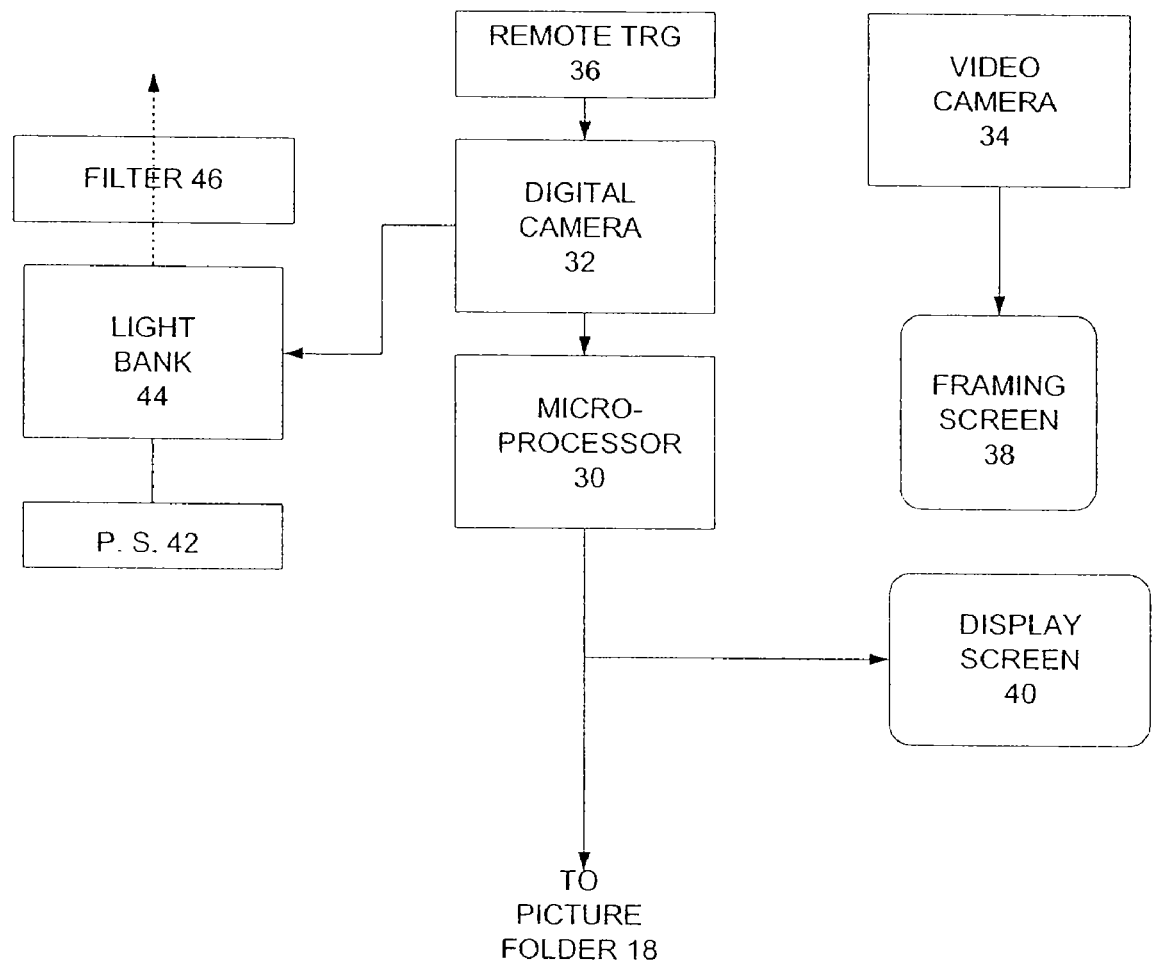
FIG. 3 shows a block diagram of the image acquisition apparatus of FIGS. 1A-2C.

Preferably, the current folder 18 and the folder watch element 22 are implemented as software running on a microprocessor incorporated in the picture capture apparatus 12, as shown in FIG. 3, however they are shown here as separate elements for the sake of clarity.

Referring now to FIGS. 2A-2C and FIG. 3, the image capture apparatus 12 includes a microprocessor 30, a digital camera 32, a video camera 34, a remote trigger 36, a framing screen 38 and a display screen 40. Some additional elements are a power supply 42 that provides power to a light bank 44. The light bank generates a burst of light which is dispersed through a a ⅛" Plexiglas diffuser 46.

Figure 2:
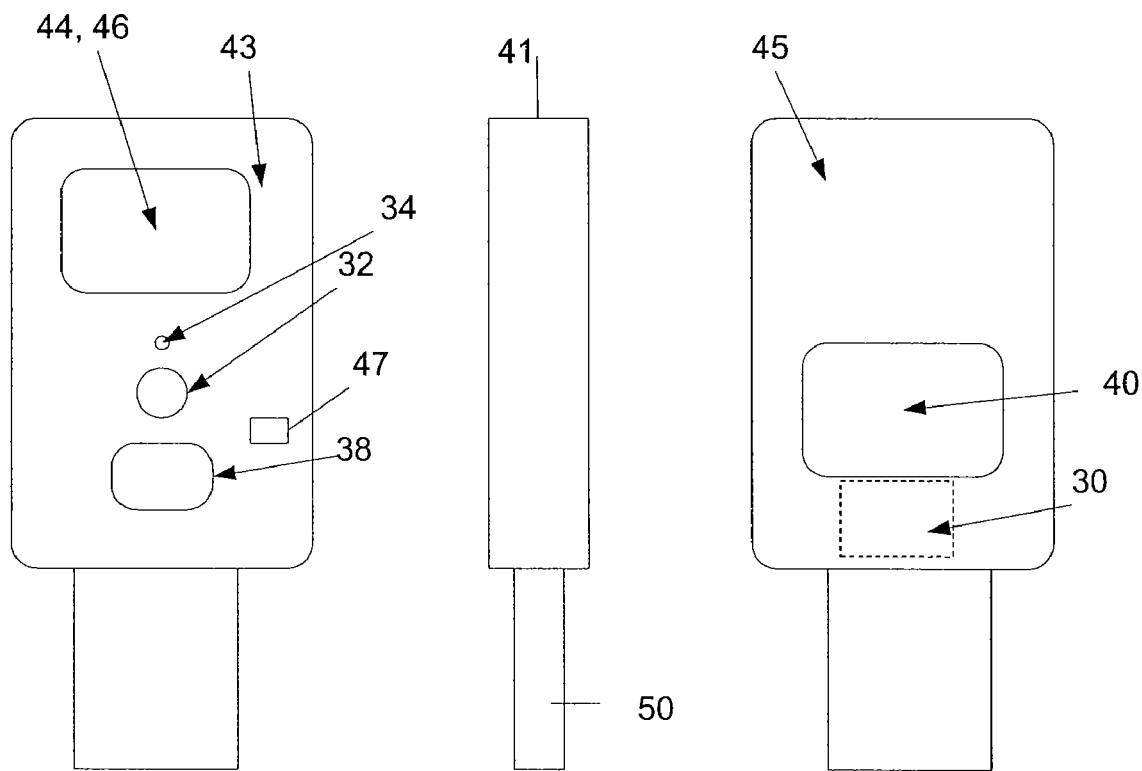
FIGS. 2A, 2B and 2C show a front, side and back view of an image acquisition apparatus used in the system of FIG. 1.

These elements preferably are installed in a common case 41 having a front wall 43 and a rear wall 45, as shown in FIGS. 2A-2C. The front wall is formed with apertures for the diffuser 46 covering the light bank 44, the video camera 34 and the digital camera 38. A socket 47 is also provided for connecting the trigger 36 to the system. Alternatively the trigger 36 may be an RF or infrared (IR) device in which case the socket 47 is replaced by an RF or IR receiver. A power supply (not shown) is included in the case to provide power to the various described elements.

The back wall is formed with an aperture for a display screen 40. The display is used to provide instructions to a user, to display advertising and other information or to display the same images as screens 26. The case 41 can be attached or mounted on a support 50. The case 41 is attached with two quickly released bolts and wing nuts (not shown). The bolts are pushed up into the case for transport and drop down when the case is set on the stand. A great advantage of the system is that the case 41 is easily removed from the support 50 and carried easily from one location to another, or stored. The case may be 32" high, 18" wide and 8" deep.

The following parts may be used to implement the image capture apparatus, it being understood that a person skilled in the art could easily replace any of these elements with other equivalent devices.

Microcomputer 30 Apple—17" iMac 1.9 GHz G5 with 2 g Intel processor)

1 SP-Systems Sync Cord—Male Phono to Male PC, Straight -10'

Light bank 44—Paterson Cyber Flash Panel—rated at 300 Watt/Seconds and preferably set to 75% output.

Trigger 36—Canon Remote Switch RS-80N3 for Canon EOS Cameras

1 Canon ET-1000N3 Cord for All N3 (EOS 3 & 1V) Accessories—33' 1 Canon ACK-E2 AC Adapter Kit for EOS 20D & EOS Digital camera 32—Canon EOS 20D, 8.2 Megapixel, SLR, Digital Camera with Canon 18-55 mm Lens.

Video Camera 34—Varizoom VZ-TFT 5.6-Inch Camera

Framing screen 38—5" LCD monitor

Display screen 40—15" LCD monitor if a MAC is used instead of a Mac mini no additional monitor is required as it is incorporated into the Imac.

The image capture apparatus 12 operates as follows. A subject 14 steps in front of the case 41 with his back to screen 16. He holds in his hand the remote trigger 36. When he is in front of the apparatus 12, the video camera 34 captures his image and shows it on the framing screen 38. For this purpose, the screen 38 is shown connected directly to the video camera, although the output of the video camera could be fed to the microprocessor 30 as well for framing purposes or other functions. Once the subject 14 decides that he is in the desired position and likes the image on framing screen 38, he is ready to take his picture. Preferably, cameras 32, 34 and framing screen 38 are aligned and disposed close to each other to eliminate or reduce parallax problems.

The subject 14 takes his own picture by activating trigger 36. This causes the digital camera 32 to activate the light bank 44 thereby causing a flash to be directed from the light bank 44 at the subject 14. As discussed before the light bank is selected to provide sufficient light for a pleasing, natural flash. The camera 32 then records the image in its memory (not shown) and passes the image to the microprocessor 30. The microprocessor 30 then stores the image as a digital file in a *jpg or other similar formats in the current picture folder. The image is then displayed on one or more large screens as described below. Optionally, the apparatus 12 is connected to a printer 60 to print out pictures from the digital images. The printer can be at any point in the network. It does not need to be at or connected to the Photobooth. These functions can be implemented using off-the-shelf software such as Canon Digital Photo Professional and Canon Remote Capture.

Figure 4:
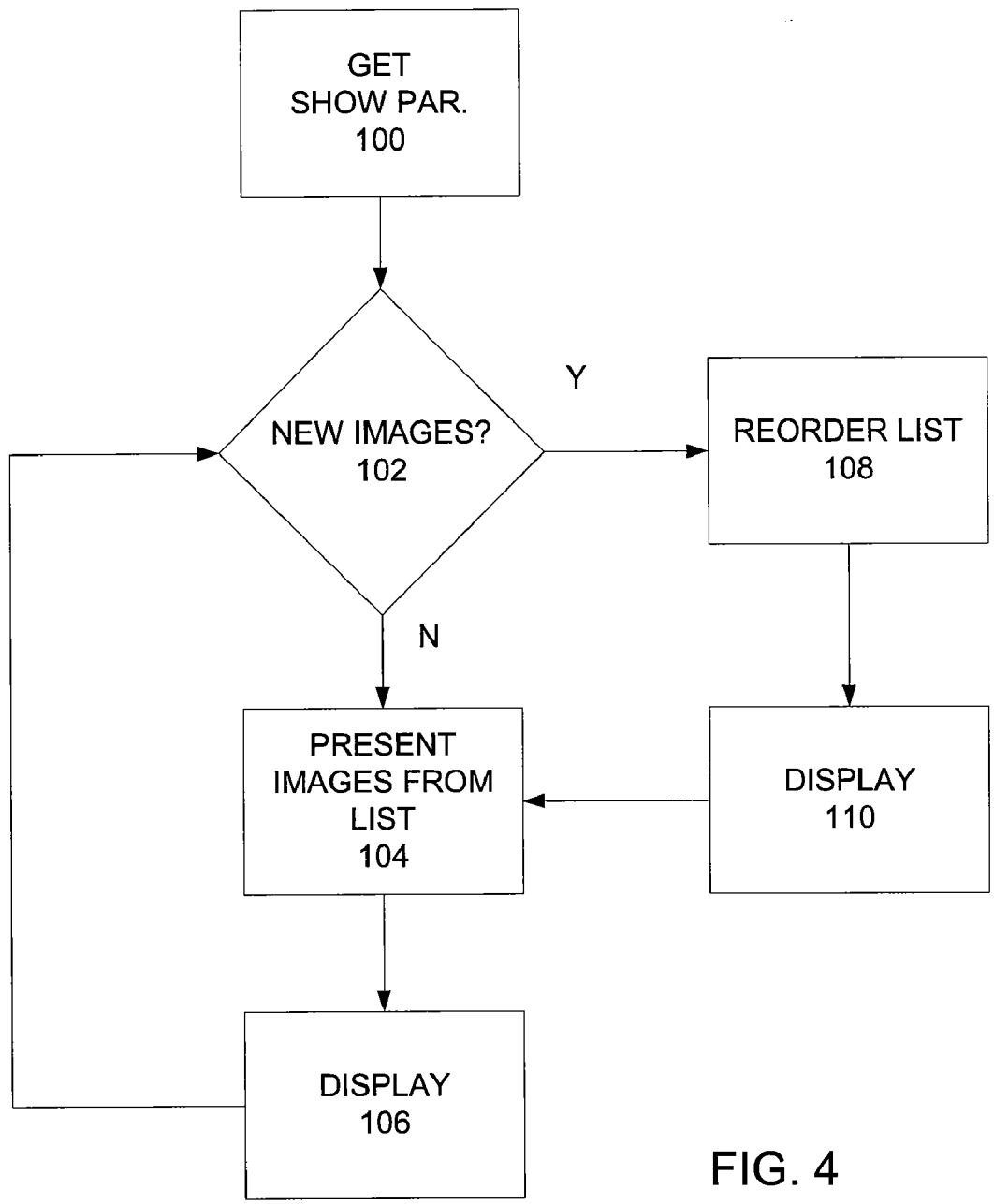
FIG. 4 shows a flow chart showing how newly acquired images are displayed.

The display of images is now described in conjunction with the flow chart of FIG. 4. This flow chart shows one possible mode of operation for the system 10. Initially, one or more images are stored in the picture folder 18. In step 100 the folder watch 20 obtains or receives commands or rules related to the manner in which the pictures are to be displayed. For example, the pictures can be displayed sequentially by name, in the order in which they were taken, randomly, and so on, and generates a list defining the order in which images are to be displayed. In step 102 the folder watch 20 looks for new images in the folder 18. (Of course, this step may be implemented at other stages of the process as well). If no new images are sensed, in step 104 the next image from the list is sent to all the controllers 22. The image is then displayed on all the screens 26, screen 40, etc. The process then cycles back to step 102.

If in step 102 some new images are sensed then in step 108 the newly loaded image or images from the image capture apparatus are obtained from the folder and immediately displayed in step 110. Thereafter, the new images are placed in the designated sequence and the slide show resumes in step 104 with the next image on the list. Of course the system can be modified easily to show the images in many different orders. Moreover the order in which the images are shown, need not be the same for all the screens 26, and not all the images need to be displayed on all the screens.

Obviously numerous modifications may be made to the invention without departing from its scope as defined in the appended claims.

I claim:

1. A system for capturing and displaying images comprising:
   an image capture apparatus including a case, a digital camera selectively activated to obtain digital images of subjects and disposed in said case;
   an electronic folder storing several digital images from said image capture apparatus;
   a controller monitoring said folder and establishing a first list defining a sequence of initial images including a first image followed by a second image, said controller checking for a new image from said image capture apparatus in said folder and, in response, generating a new list defining a second sequence including said new image, wherein in said second sequence said new image is positioned between said first and second images; and
   a plurality of displays receiving images from said folder, wherein said displays show said first image while said new image is stored in said folder, and show said new image ahead of said second image.

2. The system of claim 1 wherein said image capture apparatus includes a framing element to assist a subject in framing the image.

3. The system of claim 2 wherein said framing element includes a video camera showing a video image of a field and a framing display showing said field.

4. The system of claim 1 wherein said case is portable.

5. The system of claim 1 wherein said displays are adapted to receive said images through a network.

6. A system for creating slide shows in a venue comprising:
   a photo booth including a digital camera, said booth being arranged and constructed to generate a current image of a user without an attendant by using said camera;
   an image folder coupled to said camera and receiving said current image; and
   a display assembly disposed away from said photo booth and connected to said image folder, said display assembly including a display and a slide controller presenting a sequence of images on said display, wherein said slide controller interrupts said sequence and inserts said current image into said sequence and presents said sequence of images with said current image being presented immediately after said current image is received from said photo booth.

7. The system of claim 6 wherein said display assembly is connected to said photo booth by one of a wired and a wireless network.

8. The system of claim 6 wherein said photo booth includes a local screen with said camera being directed at said screen, whereby the user stands in front of the screen to have said image taken by said camera.

9. The system of claim 8 wherein the photo booth further includes a local display and an auxiliary camera for generating an instantaneous image of the user on said local display for framing.

10. The system of claim 6 wherein said photo booth further includes a trigger mechanism activated by the user to trigger the camera.

11. The system of claim 6 further comprising a plurality of display assemblies connected to said photo booth by a communication network, each display assemblies being disposed at a remote location from said photo booth and being arranged and constructed to show a slide show of initial images arranged in sequence independently of the other display assemblies and wherein each display assembly cooperates with said folder to show said current image on each display by inserting said current image immediately after said current image is generated.

12. A method of producing slide shows in a venue, comprising:

arranging a plurality of displays in said venue to display a respective slide show by presenting a sequence of images in order, each respective sequence including a respective first and second image;

providing a photo booth including a digital camera and accessories designed to allow a user to take his own picture with the digital camera to generate a current image;

obtaining a current image of a user from said photo booth;

transmitting said current image to each of said displays;

at each display, inserting said current image into said respective sequence, wherein each display shows, in sequence, said first respective image while said current image is acquired, said current image and said second image; and checking at predetermined intervals if there is a current image available, and if there is no current image available, then playing said preselected images in said sequence.

13. The method of claim 12 further comprising sending said current image to said displays via a network.

14. The method of claim 12 further comprising storing a plurality of images in a folder associated with said photo booth and generating said slide shows using images from said camera.

15. The method of claim 14 further comprising editing images in said folder without interrupting the slide show at any display.

16. The method of claim 12 further comprising printing images automatically upon capture and display.

17. The method of claim 12, wherein said photo booth and said display are in a single room and said sequence comprises a plurality of photographs which are obtained and displayed concurrently.

* * * * *